United States Patent [19]

Savage, Sr.

[11] Patent Number: 5,431,094
[45] Date of Patent: Jul. 11, 1995

[54] NUT DEHULLING APPARATUS

[76] Inventor: Basil W. Savage, Sr., 400 Industrial Rd., Madill, Okla. 73446

[21] Appl. No.: 112,601

[22] Filed: Aug. 26, 1993

[51] Int. Cl.[6] .......................... A23N 5/00; A23N 5/08
[52] U.S. Cl. ...................................... 99/626; 99/574; 99/621; 99/625; 99/628
[58] Field of Search .................. 99/518, 519, 523–525, 99/574, 575, 617–620, 600, 609, 621, 622, 623, 625, 628, 626; 426/481, 482

[56] References Cited

U.S. PATENT DOCUMENTS

| | | | |
|---|---|---|---|
| 219,904 | 8/1879 | Brazeal | 99/617 X |
| 1,342,690 | 6/1920 | Pape | |
| 1,606,225 | 11/1926 | Hopkins et al. | 99/575 X |
| 1,611,794 | 12/1926 | Vaughan | 99/575 |
| 2,147,022 | 2/1939 | Formway | 83/35 |
| 2,208,239 | 7/1940 | Anderson | 83/35 |
| 2,394,745 | 2/1946 | Brown | 83/35 |
| 2,460,769 | 2/1949 | Schwarz | 99/611 |
| 2,500,675 | 3/1950 | Goodwin | 99/575 |
| 2,599,892 | 6/1952 | Brown | 99/618 |
| 3,303,864 | 2/1967 | Bailey | 146/11 |
| 3,745,913 | 7/1973 | Hobbs | 99/625 |
| 3,951,056 | 4/1976 | McGehee | 99/569 |
| 4,353,294 | 10/1982 | Dudley | 99/575 |
| 4,819,331 | 4/1989 | Joyama | 99/574 |
| 5,024,148 | 6/1921 | Moses | 99/618 |

Primary Examiner—Timothy F. Simone
Attorney, Agent, or Firm—Dougherty, Hessin, Beavers & Gilbert

[57] ABSTRACT

A nut dehulling apparatus for more effectively removing the green hull or shuck from pecans includes a housing having a housing inlet and a housing outlet. A rotatable scrubbing means and an endless conveyor belt are disposed in the housing. Further included is a means for rotating the scrubbing means and means for moving the endless conveyor belt. The endless conveyor belt includes a nut contact portion which, along with the rotatable scrubbing means, defines a nut passageway wherein the scrubbing means engage pecans. The nut passageway circumscribes approximately one-half the scrubbing means. The endless conveyor belt is located in the housing such that nuts deposited in the inlet are carried by the conveyor belt through the nut passageway into engagement with the scrubbing means. The separated nuts and hulls are then carried by the endless conveyor belt to the housing outlet. The apparatus also includes a vacuum source disposed in the housing. The vacuum source communicates with the lower surface of the nut contact portion of the endless conveyor belt and acts to pull that portion of the endless conveyor belt away from the scrubbing means. The vacuum source thus provides a means for reducing wear and tear on the endless conveyor belt and the scrubbing means.

24 Claims, 5 Drawing Sheets

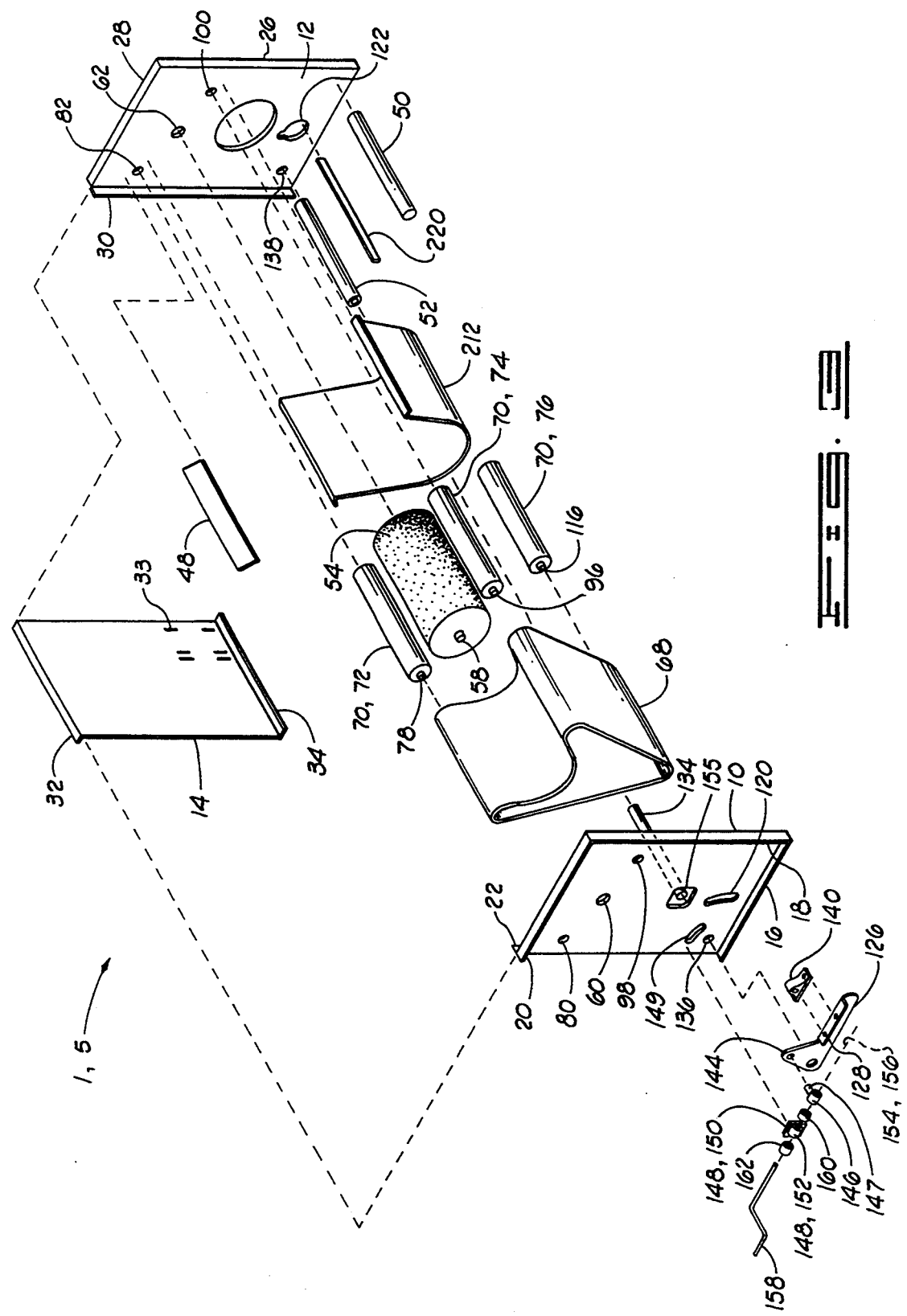

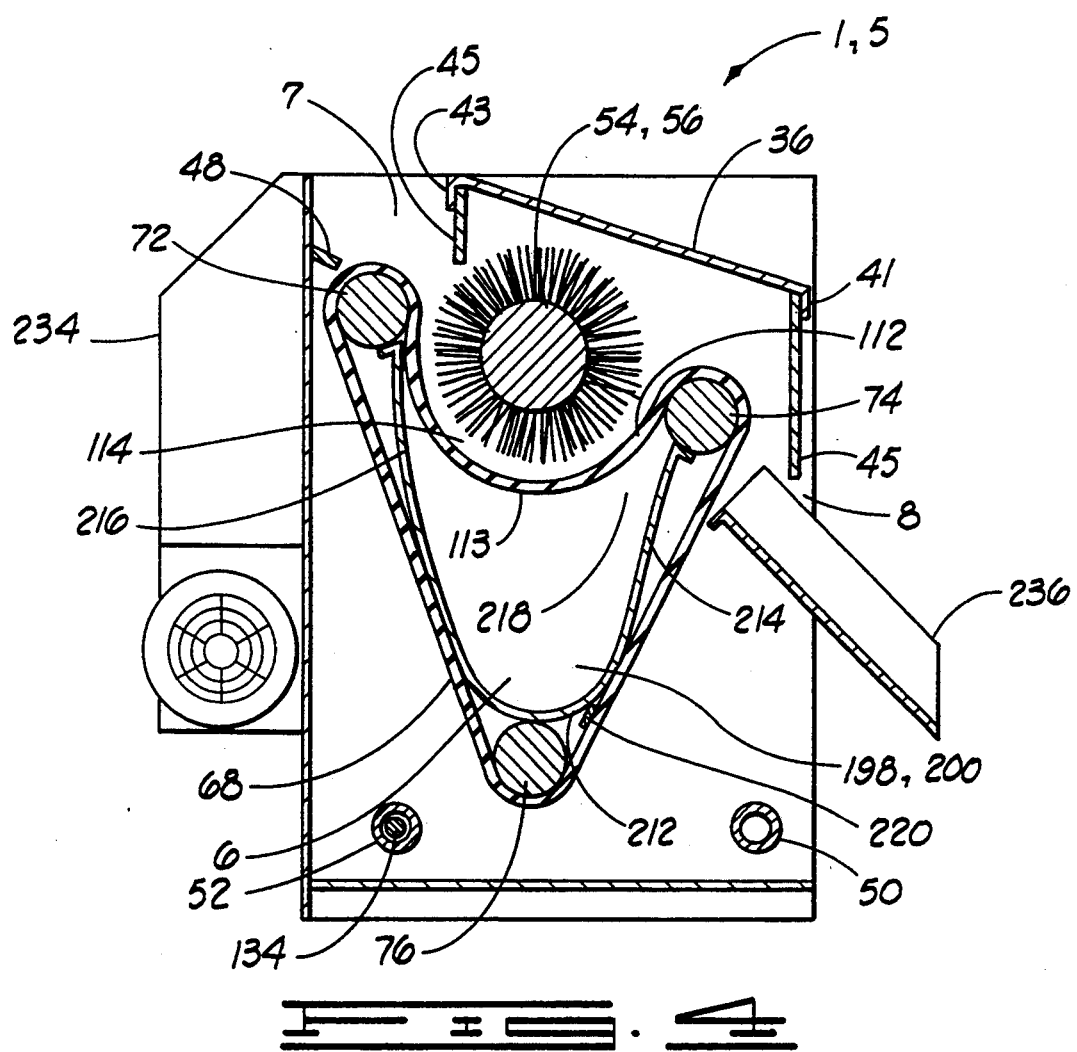

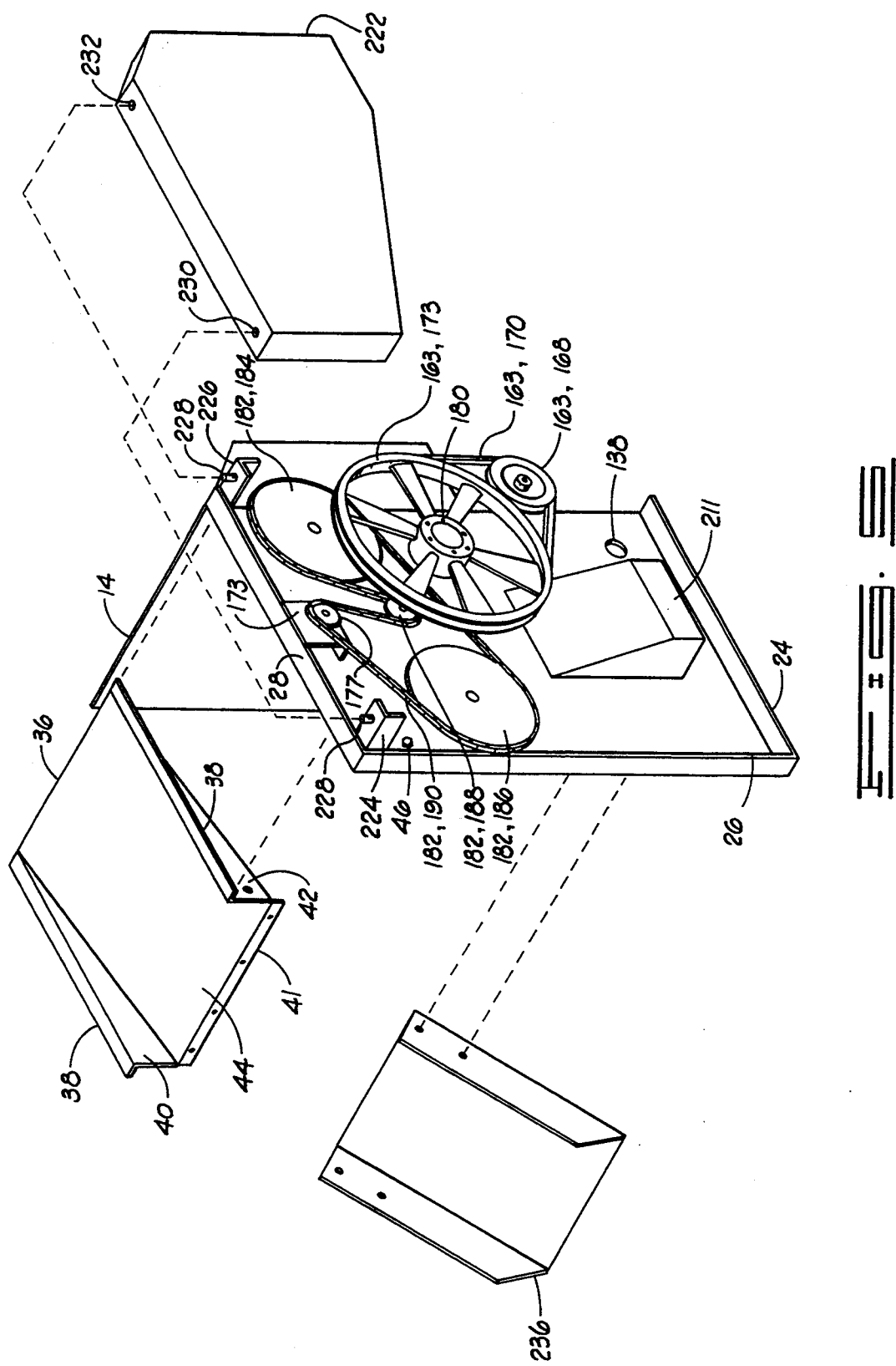

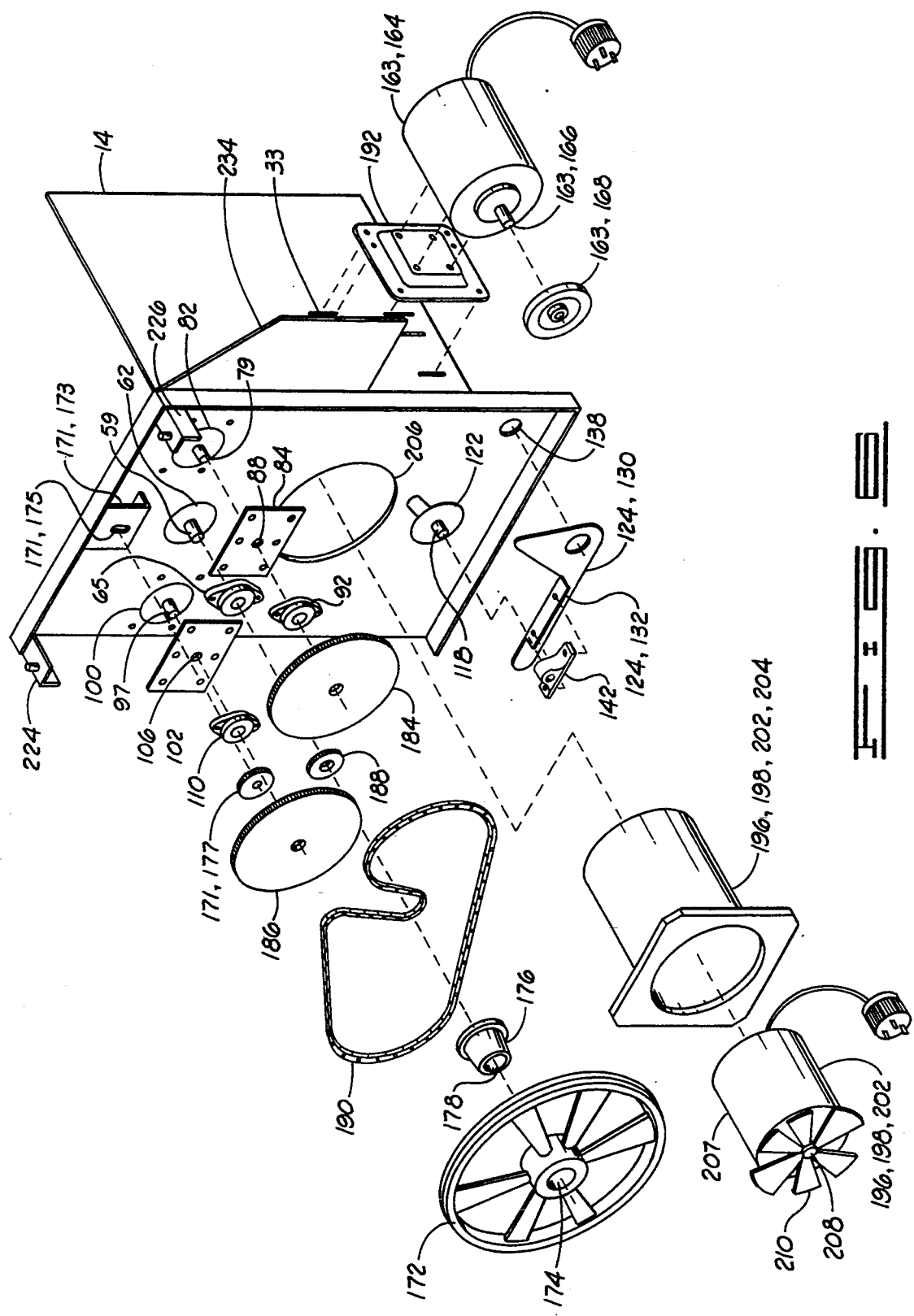

ns for dehulling pecans. The apparatus in-
NUT DEHULLING APPARATUS

BACKGROUND OF THE INVENTION

1. Field of the Invention

The present invention relates generally to an apparatus for removing the hulls from nuts, and more particularly but not by way of limitation, to such apparatus for removing the outer hulls or shucks, commonly known as sticktights, from pecans.

2. Description of Prior Art

Typically, if a pecan is permitted to remain on a tree until it falls naturally, it will fall without its outer shuck. However, for various reasons, pecans often fall from the tree with its green outer hull or shuck still attached to the pecan. In the pecan harvesting industry, pecan growers generally shake the trees so that pecans fall prior to the time they would have fallen naturally. Therefore, many pecans are still enclosed in the green shuck. Additionally, minor insect or fungus damage to the shuck can prevent the shuck from opening properly. Thus, many good pecans which can contribute to a successful harvest are picked up still in the shuck. It is therefore important to remove the shucks from as many pecans as possible.

Typical prior art dehulling apparatus utilize a rotating brush to scrub pecans still in the shuck across a fixed sheet of expanded metal grating. Other dehullers utilize conveyor belts which carry pecans past a stationary scrubbing brush. Such a configuration allows a very short brush/nut contact time. Although such conventional dehullers capably remove the hulls from some pecans, many otherwise harvestable pecans remain in the shuck.

Summary of the Invention

The present invention provides an improved apparatus for removing hulls from pecans. The apparatus includes a housing which has a housing inlet for receiving pecans and a housing outlet for expelling dehulled pecans. An endless conveyor belt, which has a nut contact portion, and a rotatable scrubbing means are disposed in the housing. A nut passageway is defined between the nut contact portion of the endless conveyor belt and the scrubbing means. Preferably, the nut contact portion of the belt circumscribes approximately one-half the outer periphery of the cleaning brush, thereby forming a substantially semicircular nut passageway.

A rotating means is provided to rotate the scrubbing means, and a conveying means moves the conveyor belt so that nuts received in the housing are carried into the nut passageway, and thus, into engagement with the rotating scrubbing means.

Also included is a vacuum source communicated with the lower surface of the nut contact portion of the endless conveyor belt. The vacuum source operates to pull the endless conveyor belt away from the scrubbing means. Thus, the vacuum source provides for a more uniform nut passageway, and provides a way to reduce wear on the rotatable scrubbing means and on the conveyor belt.

The invention as described provides an improved method for dehulling pecans. The invention provides for increased nut/brush contact time, thereby removing hulls from pecans which with prior art systems would have remained attached to the pecan. Additionally, the invention provides for reduced wear and tear on the scrubbing means and on the endless conveyor belt.

Numerous other objects, features and advantages of the present invention will be readily apparent to those skilled in the art upon review of the following disclosure when taken in conjunction with the accompanying drawings.

BRIEF DESCRIPTION OF THE DRAWINGS

FIG. 3 is an exploded view of the apparatus showing the left rear and right side panels and illustrates the construction of the interior of the apparatus.

FIG. 4 is a section view taken through the center of the apparatus.

FIG. 5 is an exploded view showing the right side of the apparatus, and illustrating the construction of the detail parts attached thereto.

FIG. 6 is an exploded view taken from the right side showing the detail parts prior to assembly.

DETAILED DESCRIPTION OF THE PREFERRED EMBODIMENTS

Figure 1:
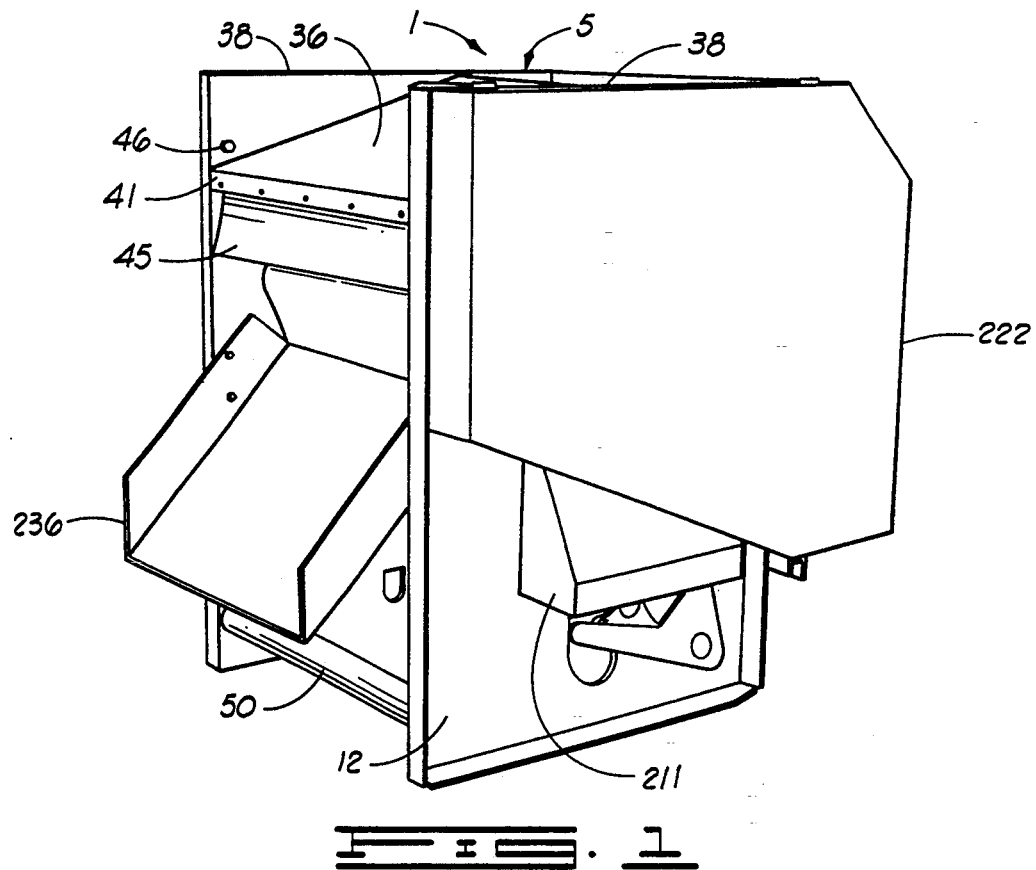
FIG. 1 is a perspective view showing the front and right sides of a nut dehulling apparatus according to the present invention.

Referring now the drawings and particularly to FIG. 1, the pecan dehulling apparatus of the present invention is there shown and generally designated by the numeral 1. As seen in FIG. 4, the apparatus 1 includes a housing 5, having an interior 6, a housing inlet 7 and a housing outlet 8.

Referring now to FIG. 3, housing 5 is shown as being comprised of a left or first side panel 10, a right or second side panel 12, and a rear panel 14. Left side panel 10 includes a lower flange 16, a forward flange 18 and an upper flange 20. Flanges 16, 18 and 20 are outward facing flanges. Left side panel 10 also includes an inward facing rear flange 22.

Right side panel 12 includes a lower flange 24, a forward flange 26, and an upper flange 28. Flanges 24, 26, 28 are outward facing flanges. Lower flange 24 is seen more clearly in FIG. 5. Right side panel 12 likewise includes an inward facing rear flange 30. Rear panel 14 includes upper outward facing flange 32, lower inward facing flange 34, and has a plurality of motor attachment slots 33 defined therein. The left and right side panels are fixedly attached to rear panel 14 by welding or other methods known in the art.

The housing 5 has a top lid 36 shown in FIG. 5, which includes upper outward facing flanges 38, left and right sides 40 and 42 respectively and a top cover 44. The left and right sides of top lid 36 fit inside the left and right side panels of the housing 5. Upper outward facing flanges 38 nest on upper outward facing flanges 20 and 28, of the left side panel 10 and the right side panel 12 respectively. Top cover 36 is attached to the left and right side panels with bolts or pins 46. The bolt or pin attachment is such that top cover 36 may be rotated from its closed position approximately 180° counterclockwise, thereby providing access to the interior of housing 5. Top lid 36 may also include forward and rear downward facing flanges 41 and 43 as seen in FIG. 4. Attached to flanges 41 and 43 is a dust cover 45.

FIG. 3 shows a guide plate 48 attached to left side panel 10, the rear panel 14 and the right side panel 12. The housing inlet 7 for receiving pecans is defined by top lid 36 and guide plate 48. Housing 5 also includes forward spreader bar 50 and rear spreader bar 52. Spreader bars 50 and 52 are fixedly attached to left side panel 10 and right side panel 12.

Figure 2:
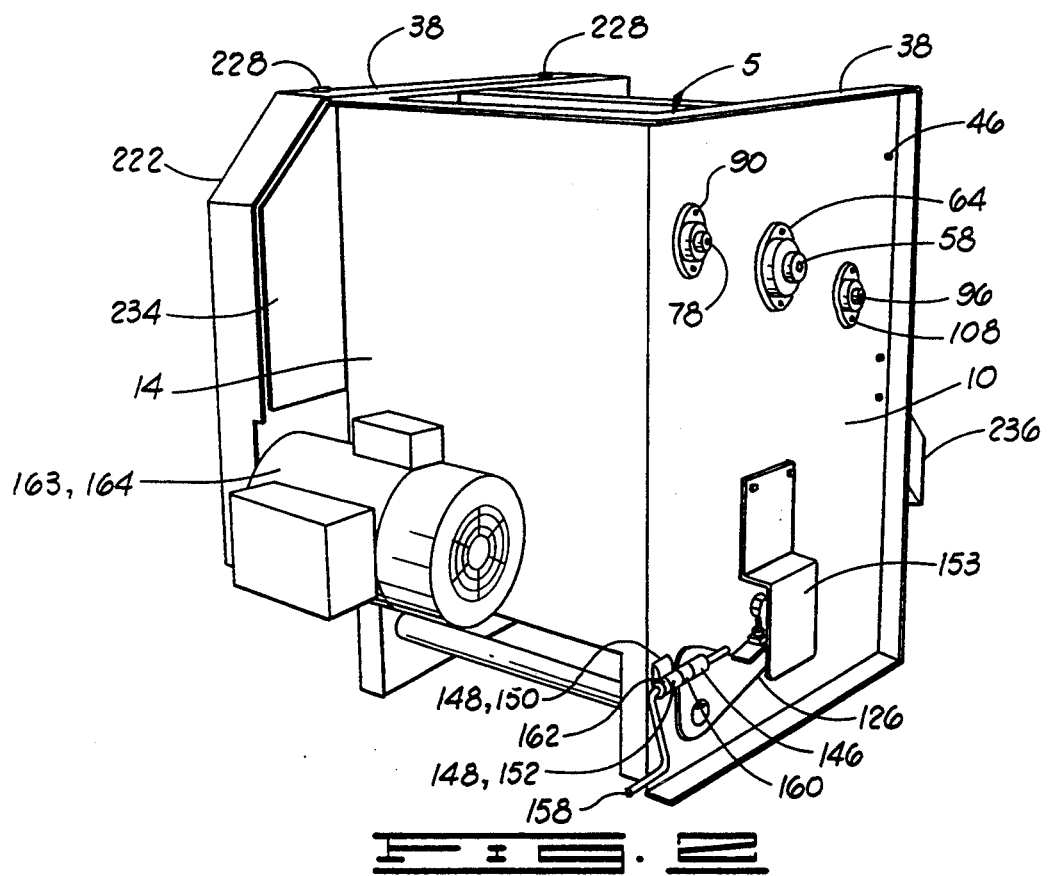
FIG. 2 is a perspective view showing the rear and left sides of the apparatus.

The apparatus 1 further includes a rotatable scrubbing means 54 disposed in the housing. Rotatable scrubbing means 54 may be comprised of a substantially cylindrical rotatable cleaning brush 56. Rotatable scrubbing means 54 includes cylindrical attachment pins 58 and 59 which extend through a set of coaxial holes 60 and 62 in the left and right side panels respectively. Cylindrical pins 58 and 59 further extend through scrubber bearings 64 and 65 attached to the left side panel 10 and right side panel 12 respectively. The extension of pins 58 and 59 through bearings 64 and 65 respectively is seen at FIGS. 2 and 6.

The invention further includes an endless conveyor belt 68 disposed in the housing. The endless conveyor belt is received about a roller assembly 70, and is positioned within housing 5 so that nuts received in housing inlet 7 are deposited on endless conveyor belt 68. Roller assembly 70 includes first upper roller 72, second upper roller 74 and lower roller 76.

First upper roller 72 includes roller attachment pins 78 and 79 extending longitudinally therefrom. Roller attachment pins 78 and 79 extend through a set of coaxial holes 80 and 82 defined in the left and right side panels respectively. A bearing 90 is attached to left side panel 10 over hole 80. Attachment pin 78 extends through and is rotatably received in bearing 90. The diameter of hole 82, shown more clearly in FIG. 6, is greater than that of first upper roller 72 so that first upper roller 72 may be removed and replaced through hole 82. A removable cover plate 84 is attached to right side panel 12 over hole 82. Cover plate 84 includes a clearance hole 88, coaxial with hole 80 through which attachment pin 79 extends. A bearing 92 is attached to cover plate 94 over hole 88. Attachment pin 79 extends through and is rotatably received in bearing 92.

Second upper roller 74 is attached to the left and right side panel in the same manner. Attachment pins 96 and 97 extend longitudinally from upper roller 74 and are received through coaxial holes 98 and 100 in the left and right side panels respectively. Attachment pin 96 extends through hole 98 and is rotatably received in a bearing 108, which is fixedly attached to left side panel 10. The diameter of hole 100, as seen in FIG. 6, is of sufficient diameter to allow second upper roller 74 to be removed and replaced therethrough. A removable cover plate 102 is attached to right side panel 12 and includes clearance hole 106 through which attachment pin 97 extends. Attachment pin 97 further extends through and is rotatably received in a bearing 110 which is fixedly attached to removable cover plate 102.

Endless conveyor belt 68 includes a nut contact or nut engagement portion 112, shown in FIG. 4, which has a lower surface 113, located between first roller 72 and second upper roller 74. A nut passageway 114 is defined between the nut contact portion 112 and rotatable scrubbing means 54. The nut passageway may be defined as nut cleaning passageway 114. Preferably, the nut contact portion of the conveyor belt forms a loop circumscribing at least approximately one-half the circumference of the rotatable scrubbing means 54. By providing for a nut passageway which circumscribes about one-half of the outer periphery of the scrubbing means, the invention provides for more nut/brush contact time than is possible with prior art dehullers.

Lower roller 76 includes lower roller attachment pins 116 and 118. Attachment pin 116 extends through a curvilinear slot 120 defined in left side panel 10. Pin 118 extends through a notched hole 122 defined in right side panel 12. Lower roller 76 is held in place by tensioning means 124 which is described more fully below.

Referring to FIGS. 3 and 6, tensioning means 124 includes a left side tension lever 126 having a bearing attachment flange 128, and a right side tension lever 130 having a bearing attachment flange 132. A tensioning bar 134 is attached at one end to tension lever 126 and at a second end to tension lever 130. Tensioning bar 134 is received in a pair of coaxial holes 136 and 138 defined in the left and right side panels respectively and passes through rear spreader bar 52. Attachment pin 116 extends through and is rotatably received in a first lower roller bearing 140 which is attached to flange 128 of tension lever 126. Attachment pin 118 extends through and is rotatably received in a second lower roller bearing 142, which is attached to flange 132 of tension lever 130. Tension lever 126 further includes an arm 144, which has a tension thread 146 attached thereto.

Tension thread 146 includes an extension 147 which is attached to and extends through arm 144. Extension 147 further extends through curvilinear slot 149 in left side panel 10, so that horizontal motion of arm 144 and tension thread 148 is not inhibited. A tension hold 148 which includes a mounting portion 150 and a tension arm receiver 152 is attached to left panel 10. Arm receiver 152 has a longitudinal central axis 154 which is coaxial with a longitudinal axis 156 of tension thread 146. A tension crank 158 is received through arm receiver 152 and is threadedly received in tension thread 146. Tension crank 158 includes a forward stop collar 160 and a rear stop collar 162. When tension crank 158 is threaded in either direction through tension thread 146, arm 144 moves substantially horizontally causing tension levers 126 and 130 to rotate about tensioning bar 134. As a result, lower roller 76 moves in a substantially vertical direction when tensioning crank 158 is turned. Thus, the tension in endless conveyor belt 68 can be adjusted simply by turning tension crank 158. A tensioning means cover plate 153, shown in FIG. 2, is attached to left side panel 10. Cover plate 153 protects bearing 140, and also covers an access opening 155 shown in FIG. 3, which is defined in left side panel 10.

Referring now to FIGS. 5 and 6, the invention includes a rotating means 163 for rotating the rotatable scrubbing means and a conveying means 182 for moving endless conveyor belt 68. The rotating means generally includes a drive motor 164 having a drive shaft 166 extending therefrom. Drive motor 164 is attached to a motor bracket 192 which is mounted to rear panel 14 at motor attachment slots 33. The embodiment shown includes six slots so that different type (i.e., single-phase or 3-phase) motors may be utilized. A motor pulley 168 is attached to the drive shaft 166. A drive belt 170 is connected to the motor pulley 168 and is likewise connected to a drive pulley 172 which may also be referred to as brush drive pulley 172. A tapered bushing 176 is received in a tapered inner diameter 174 of brush drive pulley 172. Cylindrical attachment pin 59 is received in an inner diameter 178 of tapered bushing 176. Tapered bushing 176 is attached to brush drive pulley 172 with bolts 180, and firmly locks pin 59 in place when bolts 180 are tightened.

Conveying means 182 includes a first roller gear 184 attached to first upper roller 72. Roller gear 184 may be attached with a slot and key arrangement or any other means known in the art. Conveying means 182 also includes a second roller gear 186 attached to the second upper roller. A drive gear 188 is attached to pin 59 of rotatable scrubbing means 54. A drive chain 190 is connected to first roller gear 184, second roller gear 186 and drive gear 188, so that when the rotatable scrubbing means rotates in a clockwise direction, first and second roller gears 184 and 186 respectively rotate in a counter-clockwise direction.

A slack adjuster 171 may be included to adjust the tension in chain 180. The slack adjuster generally includes a mounting bracket 173 having a slot 175 defined therein attached to right side panel 12. A roller gear 177 is attached to mounting bracket 175. Roller gear 177 is releasably attached to that it can be moved along slot 175, and then locked in place so as to prevent sliding while at the same time allowing free rotation.

The apparatus of the present invention further includes a pulling means 196 for pulling the nut contact portion of the endless conveyor belt away from the rotatable scrubbing means. The pulling means is shown best at FIGS. 4 and 6. The pulling means generally comprises a vacuum source 198 having an operable and an inoperable position disposed in the housing 5. The vacuum source is communicated with a lower surface 113 of the nut contact portion 112 of endless conveyor belt 60. The vacuum source holds the belt away from the rotating scrubbing means thereby reducing wear on the scrubbing means and on the endless conveyor belt. The vacuum source generally comprises a vacuum chamber 200 and an exhaust means 202.

The exhaust means may generally be comprised of a vacuum housing 204, having a vacuum motor 207 disposed therein, received in an opening 206 defined in right panel 12, and fixedly attached thereto. Vacuum motor 207 has a vacuum shaft 208 extending therefrom with a vacuum fan 210 attached thereto.

A vacuum hood 211, shown in FIG. 1, is attached to right side panel 12, so that debris pulled from the interior 6 of housing 5 is deflected downward. As seen in FIG. 4, vacuum chamber 200 is defined by a U-shaped vacuum trough 212 located in the housing. The U-shaped vacuum trough is fixed to the left and right side panels and has first and second upward pointing legs 214 and 216 respectively. Vacuum trough 212 also includes an open top side 218 between legs 214 and 216. The nut contact portion of the endless conveyor belt spans the open top side 218 of U-shaped vacuum trough 212 thereby defining vacuum chamber 200. A belt guide strap 220 is attached at one end to the left side panel and at the other end to the right side panel. The belt guide strap 220 is located outside U-shaped vacuum trough 212 and acts to hold endless conveyor belt 68 away from the vacuum trough to prevent friction and wear.

A drive cover 222, shown in FIG. 5, includes attachment holes 230 and 232 and is attached to the housing to protect rotating means 163 and conveying means 182. The drive cover is attached to L-shaped brackets 224 and 226 which extend outward from the upper edge of right side panel 12. L-shaped brackets 224 and 226 have upwardly extending pins 228, which are received in holes 230 and 232. The rotating and conveying means are also protected by a rear cover 234 attached to rear panel 14. Rear cover 234 comprises a flat plate extending rearward from the intersection of rear panel 14 and right side panel 12. An exit through 236 is attached to the housing 5, which together with top lid 36 defines housing outlet 8.

Method of Operation

The present invention provides an apparatus which can more efficiently and effectively remove the hulls from pecans. As is clearly seen from the foregoing description, pecans with hulls still attached are received in housing inlet 7. The nuts are then deposited on endless conveyor belt 68 and carried through nut cleaning passageway 114. Rotating means 163 causes scrubbing means 54 to rotate while conveying means 182 causes endless conveyor belt 68 to move in the same direction as the outer periphery of the rotating scrubbing means. Thus, the nuts are continuously engaged by rotating scrubbing means 54 as they pass through nut cleaning passageway 114. Because the nut cleaning portion 112 of the endless conveyor belt 68 circumscribes about one-half of scrubbing means 54, the nuts are in contact with the scrubbing means for an extended period of time, thus providing more efficient hull removal. After the hulls are removed in the nut passageway, the nuts and separated hulls are carried to the housing outlet 8 by endless conveyor belt 68.

As nuts pass through nut cleaning passageway 114, vacuum source 198 operates to pull the nut contact portion of the belt away from the scrubbing means, thereby reducing wear on the belt and the scrubbing means. The exhaust means 202 pulls air from vacuum chamber 200, pulling nut contact portion 112 of belt 68 downward, away from scrubbing means 54. By pulling the belt away from scrubbing means 54, the apparatus provides for less wear and tear on the belt and the scrubbing means. The vacuum source will be in its operable position prior to actuating the rotating means and conveying means. Once the vacuum source, rotating means and conveying means are all in operation, the tension in the endless conveyor belt can be adjusted to optimum by turning tension crank 158, thus providing for optimum nut/brush engagement.

Thus, it is seen that the apparatus of the present invention readily achieves the ends and advantages mentioned as well as those apparent therein. While certain preferred embodiments of the invention have been illustrated and described for purposes of the present disclosure, numerous changes may be made by those skilled in the art which changes are encompassed within the scope and spirit of the present invention as defined by the appended claims.

What is claimed is:

1. An apparatus for dehulling nuts comprising:
    a housing having a housing inlet for receiving nuts and a housing outlet for expelling nuts;
    a rotatable scrubbing means disposed in said housing for engaging said nuts, said rotatable scrubbing means comprising a substantially cylindrical rotatable brush;
    an endless conveyor belt disposed in said housing, said conveyor belt having a nut engagement portion operably associated with said rotatable scrubbing means so that a nut passageway, wherein said scrubbing means engage said nuts, is defined therebetween;
    conveying means for moving said belt so that said nuts are carried through said nut passageway and into engagement with said rotatable scrubbing means thereby dehulling said nuts; and rotating means for rotating said rotatable scrubbing means.

2. The apparatus of claim 1, wherein said rotating means rotates said rotatable scrubbing means such that said nut engagement portion of said conveyor belt and the outer periphery of said scrubbing means move in the same direction.

3. The apparatus of claim 1, wherein said nut engagement portion of said endless conveyor belt forms a loop circumscribing at least about one-half of the circumference of said brush.

4. The apparatus of claim 1, further comprising:
a roller assembly disposed in said housing; and
wherein said endless conveyor belt is received about said roller assembly.

5. The apparatus of claim 1, wherein said rotating means comprises:
a drive motor having a drive shaft extending therefrom;
a motor pulley attached to said drive shaft;
a drive pulley attached to said rotatable scrubbing means; and
a drive belt received about said drive pulley and said motor pulley.

6. An apparatus for dehulling nuts comprising:
a housing having a housing inlet for receiving nuts and a housing outlet for expelling said nuts;
a rotatable scrubbing means disposed in said housing for engaging said nuts;
an endless conveyor belt disposed in said housing, said conveyor belt having a nut engagement portion operably associated with said rotatable scrubbing means so that a nut passageway, wherein said scrubbing means engage said nuts, is defined therebetween;
conveying means for moving said belt so that said nuts are carried through said nut passageway and into engagement with said rotatable scrubbing means thereby dehulling said nuts;
rotating means for rotating said rotatable scrubbing means; and
a roller assembly disposed in said housing, said endless conveyor belt being received about said roller assembly, said roller assembly comprising:
a first upper roller rotatably disposed in said housing;
a second upper roller rotatably disposed in said housing, said first and second rollers being located on radially opposite sides of said rotatable scrubbing means, so that said nut engagement portion of said endless conveyor belt forms a loop partially circumscribing said rotatable scrubbing means; and
a lower roller rotatably disposed in said housing.

7. The apparatus of claim 6, further comprising tensioning means, for adjusting the tension in said conveyor belt, said tensioning means being operably associated with said lower roller so that said tensioning means moves said lower roller in a substantially vertical direction, thereby adjusting the tension in said conveyor belt.

8. The apparatus of claim 6, wherein said conveying means comprises:
a drive gear attached to said rotatable scrubbing means;
a first roller gear attached to said first upper roller;
a second roller gear attached to said second upper roller; and
a drive chain meshing with said drive gear and said first and second roller gears, so that when said rotatable scrubbing means rotates clockwise, said first upper roller and said second upper roller rotate counterclockwise.

9. An apparatus for dehulling nuts comprising:
a housing having a housing inlet for receiving nuts and a housing outlet for expelling said nuts;
a rotatable scrubbing means disposed in said housing for engaging said nuts;
an endless conveyor belt disposed in said housing, said conveyor belt having a nut engagement portion operably associated with said rotatable scrubbing means so that a nut passageway, wherein said scrubbing means engage said nuts, is defined therebetween;
conveying means for moving said belt so that nuts are carried through said nut passageway and into engagement with said rotatable scrubbing means thereby dehulling said nuts;
rotating means for rotating said rotatable scrubbing means; and
pulling means for pulling said nut engagement portion of said belt away from said rotatable scrubbing means.

10. The apparatus of claim 9, wherein said pulling means comprises a vacuum source disposed in said housing, said vacuum source having an operable and an inoperable position.

11. The apparatus of claim 10, wherein said vacuum source pulls air from an interior of said housing when said vacuum source is in said operable position, thereby pulling said nut engagement portion of said endless conveyor belt away from said rotatable scrubbing means.

12. The apparatus of claim 9, wherein said housing includes a side panel having an opening defined therein, and wherein said pulling means comprises a vacuum source received in said opening in said side panel.

13. The apparatus of claim 12, wherein said vacuum source comprises:
a vacuum housing attached to said side panel at said opening and extending inwardly therefrom into an interior of said housing;
a vacuum motor disposed in said vacuum housing, said vacuum motor having a vacuum shaft extending therefrom; and
a vacuum fan attached to said vacuum shaft, so that when said vacuum motor is actuated, said vacuum fan pulls air from the interior of said housing, thereby pulling said nut engagement portion of said conveyor belt away from said rotatable scrubbing means.

14. An apparatus for removing hulls from nuts comprising:
a housing, having an inlet for receiving nuts and an outlet;
a rotatable scrubbing means disposed in said housing;
an endless conveyor belt disposed in said housing, said conveyor belt having a nut contact portion operably associated with said rotatable scrubbing means so that a nut cleaning passageway, wherein said rotatable scrubbing means contacts said nuts, is defined therebetween; and
a vacuum source located in said housing and communicated with a lower surface of said nut contact portion of said endless conveyor belt, so that said nut contact portion of endless conveyor belt is pulled away from said rotatable scrubbing means by said vacuum source.

15. The apparatus of claim 14, wherein said vacuum source provides a means for reducing wear on said rotatable scrubbing means and on said endless conveyor belt.

16. The apparatus of claim 14, wherein said nut engagement portion of said endless conveyor belt forms a loop circumscribing at least approximately one-half of the circumference of said rotatable scrubbing means.

17. The apparatus of claim 14, wherein said vacuum source comprises:
a vacuum chamber defined in said housing; and
an exhaust means for exhausting air from said vacuum chamber.

18. The apparatus of claim 17, further comprising:
a U-shaped vacuum trough located in said housing and having first and second upward pointing legs and an open top side between said legs, said nut contact portion of said endless conveyor belt spanning said open top side, said vacuum chamber being defined within said U-shaped vacuum trough.

19. The apparatus of claim 18, further comprising:
a first upper roller rotatably disposed in said housing, said first upper roller being positioned substantially above said first leg of said U-shaped vacuum trough;
a second upper roller rotatably disposed in said housing, said second upper roller being positioned substantially above said second leg of said U-shaped vacuum trough;
a lower roller rotatably disposed in said housing, said lower roller being positioned substantially beneath a lowermost point of said U-shaped trough; wherein
said endless conveyor belt is received about said first upper roller, said second upper roller and said lower roller, said first and second upper rollers being located on radially opposite sides of said rotatable scrubbing means so that said nut cleaning passageway constitutes a loop surrounding substantially one-half of the periphery of said rotatable scrubbing means.

20. The apparatus of claim 19, wherein said rotatable scrubbing means is a cylindrical rotatable cleaning brush.

21. The apparatus of claim 19 further comprising:
a guide strap, attached to said housing, positioned between said U-shaped trough and said conveyor belt, for holding said conveyor belt away from said vacuum trough.

22. The apparatus of claim 19 further comprising:
tensioning means operably associated with said lower roller for adjusting the tension in said endless conveyor belt.

23. The apparatus of claim 19, further comprising:
a drive motor, having a drive shaft extending therefrom;
a motor pulley attached to said drive shaft;
a motor drive pulley attached to said rotatable scrubbing means; and
a drive belt, connected to said brush drive pulley and said motor pulley.

24. The apparatus of claim 19, further comprising:
a drive gear attached to said rotatable scrubbing means;
a first roller gear attached to said first upper roller;
a second roller gear attached to said second upper roller;
a drive chain connected said drive gear and said first and second roller gears, so that when said rotatable scrubbing means rotates clockwise said first and second upper rollers rotate counterclockwise.

* * * * *